United States Patent
Pick et al.

(10) Patent No.: US 6,859,453 B1
(45) Date of Patent: Feb. 22, 2005

(54) CLEAR CHANNEL ACCESS METHODS, APPARATUSES, MEDIA AND SIGNALS

(75) Inventors: LeRoy L. Pick, Nepean (CA); David C. Steele, Kanata (CA); Evert E. Deboer, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 798 days.

(21) Appl. No.: 09/739,003

(22) Filed: Dec. 19, 2000

(51) Int. Cl.$^7$ .............................................. H04L 12/50
(52) U.S. Cl. ................................... 370/358; 370/539
(58) Field of Search ................................ 370/242, 255, 370/353, 358, 465, 539

(56) References Cited

U.S. PATENT DOCUMENTS

| | | | | |
|---|---|---|---|---|
| 5,315,594 A | * | 5/1994 | Noser .......................... | 370/353 |
| 5,452,306 A | * | 9/1995 | Turudic et al. ............. | 370/465 |
| 5,455,832 A | * | 10/1995 | Bowmaster ................. | 370/242 |
| 5,841,760 A | | 11/1998 | Martin et al. ................ | 370/242 |
| 6,654,802 B1 | * | 11/2003 | Oliva et al. ................. | 370/255 |

OTHER PUBLICATIONS

ANSI Standard T1.105.05—1994 "American National Standard For Telecommunications—Synchronous Optical Network (SONET)—Tandem Connection Maintenance", American National Standards Institute, New York, New York, 1994.

International Telecommunication Union Standard, ITU–T, Rec. G. 707, "Network Node Interface for the Synchronous Digital Hierarchy (SDH)", pp. 90–114, Mar., 1996.

* cited by examiner

Primary Examiner—Salvatore Cangialosi (57) ABSTRACT

Methods, apparatuses, media and signals for providing clear channel access on a network are disclosed. A first method involves receiving a communication signal from a remote network element. The communication signal includes a previous transport overhead (PTOH) portion indicative of transport overhead contents of the communication signal prior to arrival at the remote network element, and a previous path error (PPE) portion indicative of path errors present in the communication signal at the remote network element. The method then involves modifying a transport overhead portion of the communication signal in response to the PTOH and PPE portions. A second method involves inserting into a communication signal received at a network element, a previous transport overhead (PTOH) portion indicative of transport overhead contents of the communication signal prior to arrival at the network element, and a previous path error (PPE) portion indicative of path errors present in the communication signal at the network element. The second method then involves transmitting the communication signal to a remote device.

48 Claims, 6 Drawing Sheets

TRANSPORT OVERHEAD MODIFICATION THREAD

CLEAR CHANNEL ACCESS METHODS, APPARATUSES, MEDIA AND SIGNALS

FIELD OF THE INVENTION

The present invention relates to network communications, and more particularly, to methods, apparatuses, media and signals for providing clear channel access on a network.

BACKGROUND OF THE INVENTION

Carriers or operators of high bandwidth networks, such as optical networks, typically sell network access to their customers, which often include telephone companies or other telecommunications service providers. For example, an operator of an optical network segment extending between two major cities may receive a number of communications signals or channels from a number of respective customers at an originating city, which are then multiplexed or combined into a single higher-speed optical communications signal. The higher-speed signal is then relayed to the destination city, where it is then demultiplexed or split apart into its component signals, which are then separately provided to the respective customers' facilities in the destination city.

Each communications signal initially provided by a customer of the network operator typically includes a payload portion in which the actual "live" communications traffic is stored, and further includes a transport overhead portion which is used by the customer for various purposes, including monitoring the occurrence of transmission errors that may arise on the customer's own communications equipment and facilities.

However, as each customer's communications signal is carried over the network operator's optical network segment extending between the two cities, it generally passes through a number of different network elements at which it is necessary for the network operator's equipment to overwrite the customer's transport overhead data, in order for the network operator to monitor the occurrence of errors on the optical network segment.

Accordingly, when the communications signal is relayed to the customer at the destination city, much of the customers transport overhead information has been destroyed. This may interfere with or destroy the ability of the customer to monitor aspects of its own facilities, such as the occurrence of errors on the customers equipment in the vicinity of the originating city, for example.

Accordingly, it would be desirable, from the point of view of some such customers, for the network operator to be able to provide a "clear channel" across the network segment, or in other words, for the network operator to pass transport overhead information to the customer at the destination city in such a way that the customer's ability to monitor the occurrence of errors on its own facilities would not be affected by anything that may have occurred over the operator's network segment, as if the network segment did not exist. One approach to a similar problem involves providing special dedicated facilities on the network segment, including a transparent multiplexer or combiner for example, along with special line facilities that preserve portions of the customer's incoming overhead information for reconstruction at the destination, so that the preserved overhead is effectively passed through the network segment transparently. Disadvantageously, however, such dedicated facilities are not capable of combining a mixture of transparent and non-transparent channels into a single optical signal, with the result that such facilities are useful only in circumstances where all of the customers whose signals are to be combined together desire transparent access to the network segment. In addition, if the individual signals that have been multiplexed into the single optical signal are not all destined for the same network node or location, it is not possible for these dedicated facilities to perform the usual seamless extraction of the individual signal at the intervening node at which the individual signal is to be dropped off. Rather, the entire signal must be demultiplexed in order to extract the individual signal that is to be dropped off, and the individual signals that are destined for subsequent network locations must be re-multiplexed or combined back into a new optical signal. This results in significantly increased equipment costs, as additional demultiplexers and re-multiplexers must be provided at any such intervening network node for signals that are merely passing through the network node. Accordingly, these dedicated facilities are not well-suited to accommodating the differing needs of different customers, and result in significantly increased equipment costs for network operators.

Accordingly, there is a need for an improved way of providing clear channel access.

SUMMARY OF THE INVENTION

Aspects of the present invention address the above needs by providing a method and an apparatus for providing clear channel access on a network. The method involves receiving a communication signal from a remote network element, the communication signal including a previous transport overhead (PTOH) portion indicative of transport overhead contents of the communication signal prior to arrival at the remote network element, and a previous path error (PPE) portion indicative of path errors present in the communication signal at the remote network element. The method further involves modifying a transport overhead portion of the communication signal in response to the PTOH and PPE portions. The apparatus includes a receiver operable to receive the communication signal, and further includes a processor circuit in communication with the receiver and configured to modify the transport overhead portion.

Advantageously, by modifying the transport overhead portion of the communication signal in response to both the previous transport overhead portion and the previous path error portion, a clear channel may be provided, allowing a customer who then receives the communication signal to process the transport overhead portion as if it had not been affected by its passage across the network.

In addition, the above method and apparatus permit implementation in network configurations other than dedicated clear channel systems, thereby allowing the communication signal to pass through normal network elements such as Line Terminating Equipment, Add/Drop Multiplexers, or Ring configurations, for example. Thus, the disadvantages associated with dedicated clear channel facilities may be avoided, if desired. For example, if desired, the method or apparatus may be implemented in typical network configurations, allowing both clear channel and non-clear channel communication signals to be multiplexed together, and allowing individual signals to be dropped off at intervening network nodes in the usual manner, without the need to demultiplex and re-multiplex the individual signals that are passing through to a subsequent network node.

The communication signal may include a plurality of component signals, in which case modifying the transport overhead portion preferably involves calculating, for each of the component signals, a difference between path errors present in the component signal and path errors present in the component signal at the remote network element. Modifying the transport overhead portion may then include calculating a sum of the differences of each of the component signals, and adding the sum of the differences to at least some contents of the PTOH portion. Advantageously, these additional features further improve the transparency of the clear access channel.

A further aspect of the invention provides a computer-readable medium for providing codes for directing a processor circuit to modify the transport overhead portion in response to the PTOH and PPE portions. Similarly, another aspect of the invention provides a signal embodied in a carrier wave, the signal including code segments for directing a processor circuit to modify the transport overhead portion in response to the PTOH and PPE portions. An additional aspect of the invention relates to an apparatus for providing clear channel access on a network, the apparatus including provisions for carrying out the above method.

In accordance with further aspects of the invention, there are provided a method and an apparatus for providing clear channel access on a network. The method involves inserting into a communication signal received at a network element, a previous transport overhead (PTOH) portion indicative of transport overhead contents of the communication signal prior to arrival at the network element, and a previous path error (PPE) portion indicative of path errors present in the communication signal at the network element. The method further involves transmitting the communication signal to a remote device. The apparatus includes a processor circuit configured to insert the PTOH and PPE portions into the communication signal, and a transmitter in communication with the processor circuit and operable to transmit the communication signal to a remote device.

Inserting the PTOH and PPE portions into the communication signal in the above manner, and transmitting the signal to the remote device, allows the remote device to use the communication signal to provide clear channel access, as described above, resulting in similar advantages to those mentioned above.

If desired, inserting the PPE portion may involve performing Tandem Connection Monitoring (TCM) or, advantageously, may involve a variation thereof. For example, if desired, rather than inserting the PPE portion into the Z5 byte in accordance with standard TCM, the PPE portion may be inserted into an unused portion of the path overhead portion, which may include either the Z3 or the Z4 byte of a Synchronous Optical NETwork (SONET) path overhead portion, for example. Advantageously, by selecting an unused portion of the path overhead for insertion of the PPE, transparency of the channel is further improved, as the customers ability to use other parts of the path overhead, such as the Z5 byte for example, is not compromised. This is particularly advantageous if the customer wishes to perform Tandem Connection Monitoring of the customer's own facilities using the Z5 byte (also referred to as the N1 byte when used for TCM), as the insertion of the PPE portion into the Z3 or Z4 byte would therefore not over-write the customer's own TCM information stored in the Z5 byte.

A further aspect of the invention relates to a computer-readable medium for providing codes for directing a processor circuit to cause the above method to be carried out. Similarly, another aspect provides a signal embodied in a carrier wave, the signal including code segments for directing a processor circuit to cause the method to be carried out.

A further aspect relates to an apparatus for providing clear channel access on a network, the apparatus including provisions for carrying out the method.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
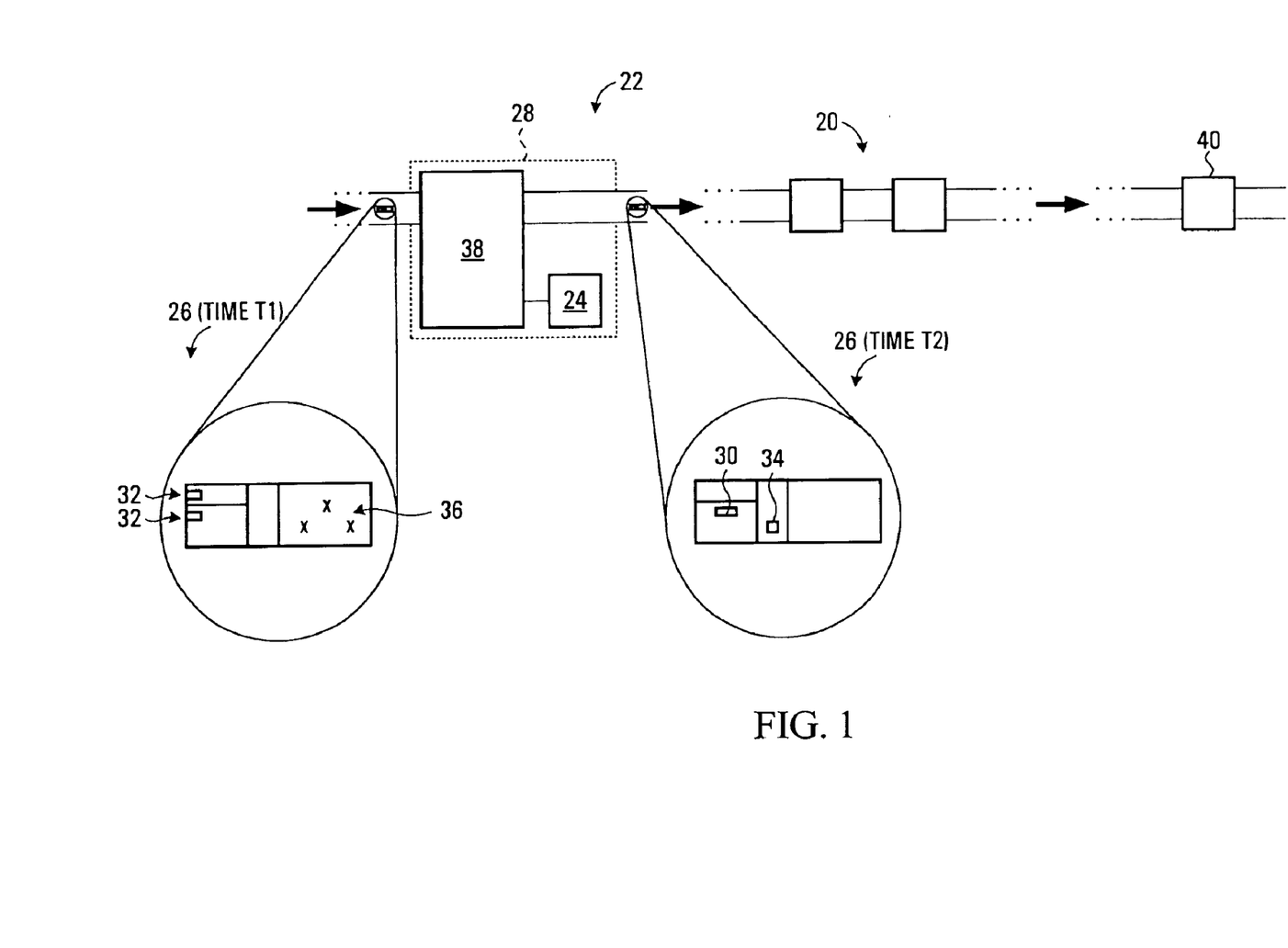
FIG. 1 is a block diagram of an apparatus for providing clear channel access on a network, according to a first embodiment of the invention.

Referring to FIG. 1, an apparatus for providing clear channel access on a network 20 according to a first embodiment of the invention is shown generally at 22. The apparatus 22 includes a processor circuit 24 configured to insert into a communication signal 26 received at a network element 28, a previous transport overhead (PTOH) portion 30 indicative of transport overhead contents 32 of the communication signal 26 prior to arrival at the network element 28, and a previous path error (PPE) portion 34 indicative of path errors 36 present in the communication signal 26 at the network element 28. The apparatus 22 further includes a transmitter 38 in communication with the processor circuit 24, operable to transmit the communication signal 26 to a remote device 40.

Figure 2:
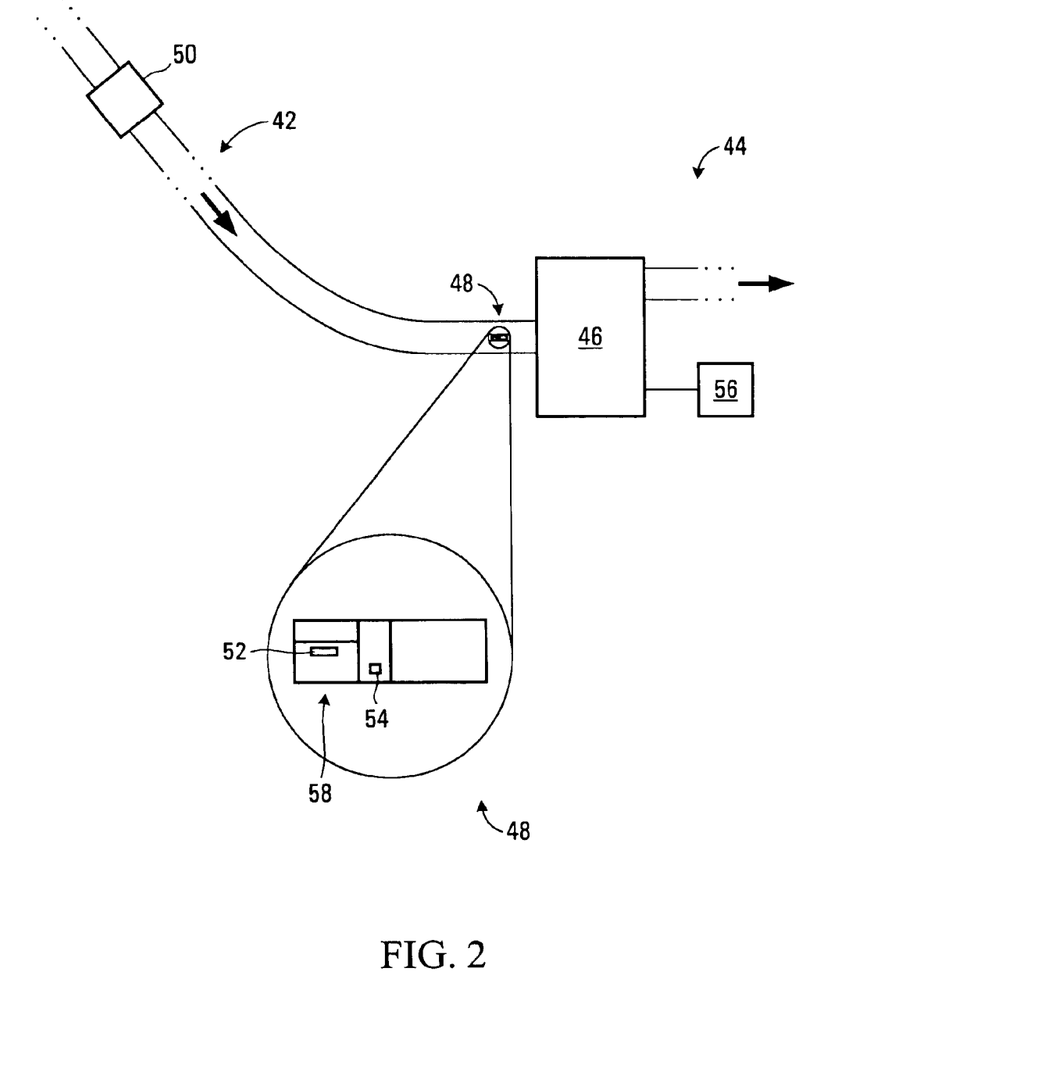
FIG. 2 is a block diagram of an apparatus for providing clear channel access on a network, according to a second embodiment of the invention.

Referring to FIG. 2, an apparatus for providing clear channel access on a network 42 according to a second embodiment of the invention is shown generally at 44. The apparatus 44 includes a receiver 46 operable to receive a communication signal 48 from a remote network element 50. The communication signal 48 includes a previous transport overhead (PTOH) portion 52 indicative of transport overhead contents of the communication signal 48 prior to arrival at the remote network element 50, and also includes a previous path error (PPE) portion 54 indicative of path errors present in the communication signal at the remote network element 50. The apparatus 44 further includes a processor circuit 56 in communication with the receiver 46. The processor circuit 56 is configured to modify a transport overhead portion shown generally at 58 of the communication signal 48 in response to the PTOH and PPE portions 52 and 54.

System

Figure 3:
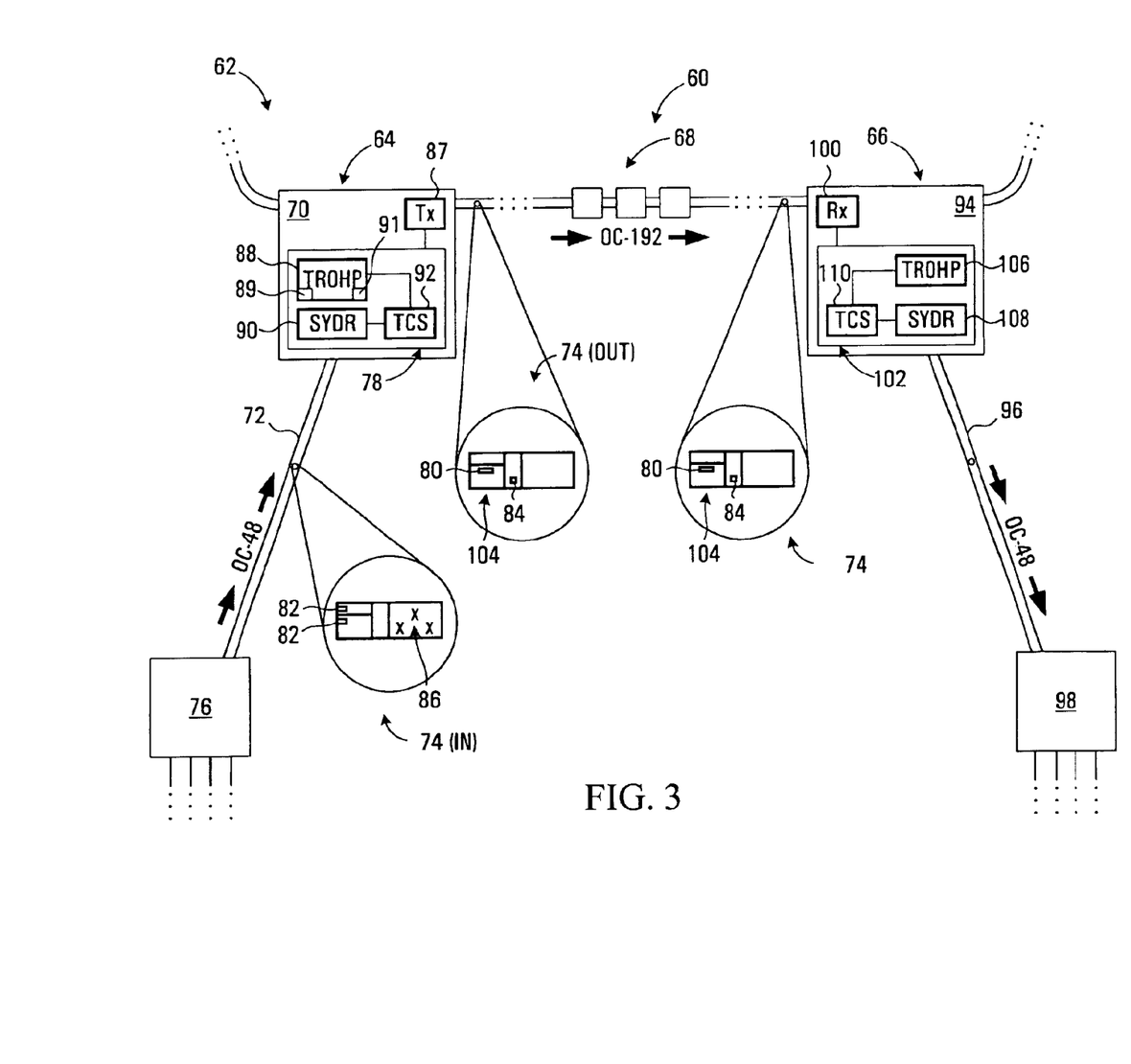
FIG. 3 is a block diagram of a system for providing clear channel access on a network, according to a third embodiment of the invention.

Referring to FIGS. 1, 2 and 3, a system for providing clear channel access on a network 60 according to a third embodiment of the invention is shown generally at 62 in FIG. 3. The system 62 includes a first apparatus, which in this embodiment is a first network element 64 similar to the apparatus shown at 22 in FIG. 1, as well as a second apparatus, which in this embodiment is a second network element 66 similar to the apparatus shown at 44 in FIG. 2. The first and second network elements are in communication with each other over the network 60.

Referring to FIG. 3, in this embodiment, the network 60 includes an optical network in accordance with Synchronous Optical NETwork (SONET) standards, although alternatively, other types of networks may be substituted. More particularly, in this embodiment the network 60 is an Optical Carrier (OC)-192 network, and includes a plurality of network elements interposed between the network elements 64 and 66, such as those shown at 68 for example. In this embodiment the interposed network elements include pluralities of both section terminating equipment and line terminating equipment devices.

The first network element 64 in the present embodiment includes a first Line Terminating Equipment (LTE) 70, having various capabilities such as cross-connecting, add/drop multiplexing, etc. The first LTE 70 is in communication with an OC-48 optical pipe 72, over which it receives a communication signal shown generally at 74, that is to be multiplexed onto the OC-192 network 60, from a first customer equipment 76.

The first network element 64 includes a processor circuit shown generally at 78, configured to insert into the communication signal 74 received at the network element 64, a previous transport overhead (PTOH) portion 80 indicative of transport overhead contents 82, which in this embodiment are transport overhead parity error portions, of the communication signal 74 prior to arrival at the network element 64, and a previous path error (PPE) portion 84 indicative of path errors 86 present in the communication signal 74 at the network element 64. The first network element 64 further includes a transmitter 87 in communication with the processor circuit 78 and operable to transmit the communication signal 74 to a remote device, which in this embodiment is the second network element 66.

In this embodiment, the processor circuit 78 includes a first transmit/receive overhead processor (TROHP) 88, a first Synchronization Driver Receiver (SYDR) device 90 and a first transport control subsystem (TCS) 92. More particularly, in this embodiment the TROHP 88 includes a TROHP4 Application Specific Integrated Circuit (ASIC), and the SYDR device 90 includes four individual SYDR4 TriFEC ASICs, manufactured by Nortel Networks Limited of Montreal, Canada. Generally, the TROHP4 ASIC is a section/line overhead processor operable to monitor and extract section and line error counts along with the other section and line overhead portions of a Synchronous Transport Signal (STS) communication signal. In this regard, the TROHP 88 includes a PM binning register 89 for binning or accumulating section (B1) parity errors, and a signal degrade binning register 91 for binning or accumulating line (B2) parity errors. Similarly, the SYDR device 90 processes path errors and path overhead, and also acts as a path data/clock synchronizer for handling timing discrepancies. Alternatively, however, other suitable circuits may be substituted.

The transmitter 87 includes a multiplexer module, a laser modulator and a laser (not shown). The first network element 64 also contains elements (not shown) that are well-known components of such network elements and are therefore omitted in FIG. 3 for clarity.

In this embodiment, the second network element 66 includes a second Line Terminating Equipment (LTE) 94, having various capabilities similar to those of the first LTE 70, including cross-connecting, add/drop multiplexing, etc. The second LTE 94 is in communication with a second OC-48 optical pipe 96, over which it transmits a modification of the communication signal 74, to a second customer equipment 98.

The second network element 66 includes a receiver 100 operable to receive a communication signal from a remote network element, which in this embodiment includes the communication signal 74 received from the first network element 64, and thus, the communication signal includes the PTOH portion 80 and the PPE portion 84. The second network element 66 further includes a processor circuit 102 in communication with the receiver 100. The processor circuit 102 is configured to modify a transport overhead portion shown generally at 104 of the communication signal 74 in response to the PTOH and PPE portions 80 and 84.

More particularly, in this embodiment the processor circuit 102 includes a second TROHP 106, a second SYDR device 108 and a second TCS 110, similar to those of the first processor circuit 78, the SYDR device 108 comprising four individual SYDR4 ASICs, for example. Also in this embodiment, the receiver 100 includes a demultiplexer module (not shown). The second network element 66 also contains elements (not shown) that are well-known components of such network elements and are therefore omitted in FIG. 3 for clarity.

In this embodiment, a Tandem Connection Maintenance (TCM) connection is established between the first and second network elements 64 and 66, as defined in accordance with The American National Standards Institute (ANSI) standard T1.105.05-1994, "Synchronous Optical Network (SONET): Tandem Connection Maintenance", which is incorporated herein by reference. Thus, in the present embodiment, the first network element 64 acts as a tandem connection originating element and the second network element 66 acts as a tandem connection terminating element.

In this regard, although one-way communication signals are primarily described herein for ease of illustration, it will be appreciated that embodiments of the invention are equally applicable to bi-directional communication, in which each one of the first and second network elements 64 and 66 performs the functions of the first network element 64 in the transmit direction, and the functions of the second network element 66 in the receive direction.

First Processor Circuit TCS

Figure 4:
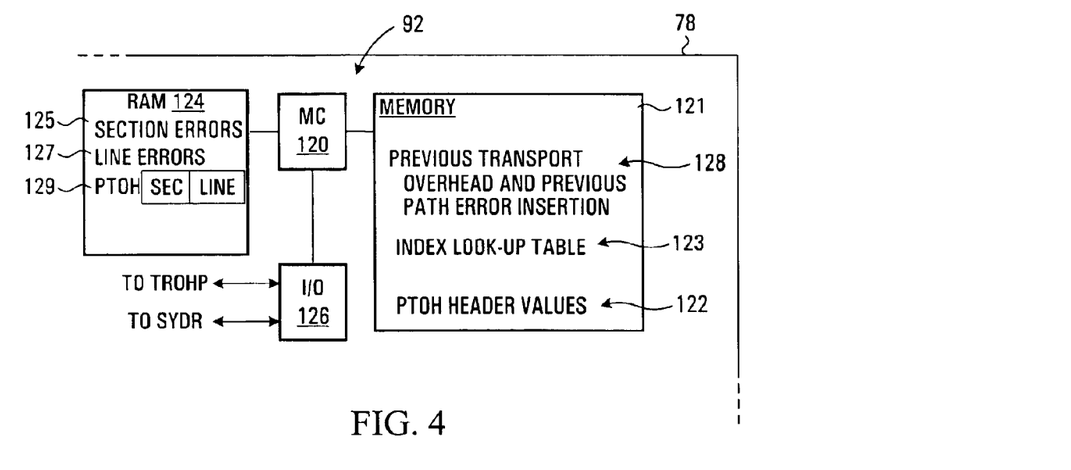
FIG. 4 is a block diagram of a transport control subsystem (TCS) of a first network element shown in FIG. 3.

Referring to FIGS. 3 and 4, the first TCS of the first processor circuit 78 is shown generally at 92 in FIG. 4. In this embodiment, the first TCS 92 includes a first microcontroller 120, in communication with a first program memory 121, a first working memory 124, and a first input/output (I/O) device 126 via which the TCS 92 is in communication with the TROHP 88, the SYDR device 90, and with other components of the network element 64.

The program memory 121, which in this embodiment includes a non-volatile memory such as a FLASH or EEPROM for example, stores various routines, subroutines and threads for execution by the microcontroller 120.

Generally, in the present embodiment the program memory 121 acts as a computer-readable medium for providing codes for directing the processor circuit 78 to insert into the communication signal 74 received at the network element 64, the previous transport overhead (PTOH) portion 80 indicative of the transport overhead contents 82 of the communication signal 74 prior to arrival at the network element 64, and the previous path error (PPE) portion 84 indicative of the path errors 86 present in the communication signal 74 at the network element 64, and to transmit the communication signal 74 to a remote device, which in this embodiment is the second network element 66. More particularly, in this embodiment the program memory stores a PTOH and PPE insertion thread 128, for directing the processor circuit 78 to insert the PTOH portion 80 and PPE portion 84 shown in FIG. 3 into the communication signal 74. Alternatively, however, it will be appreciated that the PTOH and PPE insertion thread 128 may be omitted if hardware components of the processor circuit 78, such as the TROHP 88 and/or the SYDR device 90 for example, are pre-configured to insert the PTOH and/or PPE portions into the communication signal 74. Similarly, any other suitable computer-readable medium may be substituted.

In addition, it will be appreciated that the program memory 121 merely provides one way of generating a signal embodied in a carrier wave, the signal including code segments for directing the processor circuit to insert the PTOH and PPE portions 80 and 84 into the communication signal in the above manner and to transmit the communication signal to a remote device. Alternatively, other types of media, signals, or ways of generating such signals may be substituted.

In this embodiment, the program memory 121 also includes a PTOH header values register 122, in which unique PTOH header values are stored, as discussed in greater detail below. The program memory 121 also stores an index look-up table 123, for use by the microcontroller in executing the PTOH and PPE insertion thread. In addition, the program memory 121 stores routines (not shown, not part of this invention) for directing the processor circuit 78 to execute conventional network element functionality such as LTE, ADM and cross-connect functionality, for example.

In this embodiment, the PTOH and PPE insertion routine 128 configures the microcontroller 120 to define various registers in the first working memory 124, including a section errors register 125 for storing an indication of accumulated section (B1) parity errors in the incoming communication signal 74 received at the first network element, a line errors register 127 for storing an indication of accumulated line (B2) parity errors in the incoming communication signal, and a PTOH register 129 for storing the PTOH portion 80 that is to be inserted into the transport overhead portion 104 of the communication signal 74.

Second Processor Circuit TCS

Figure 5:
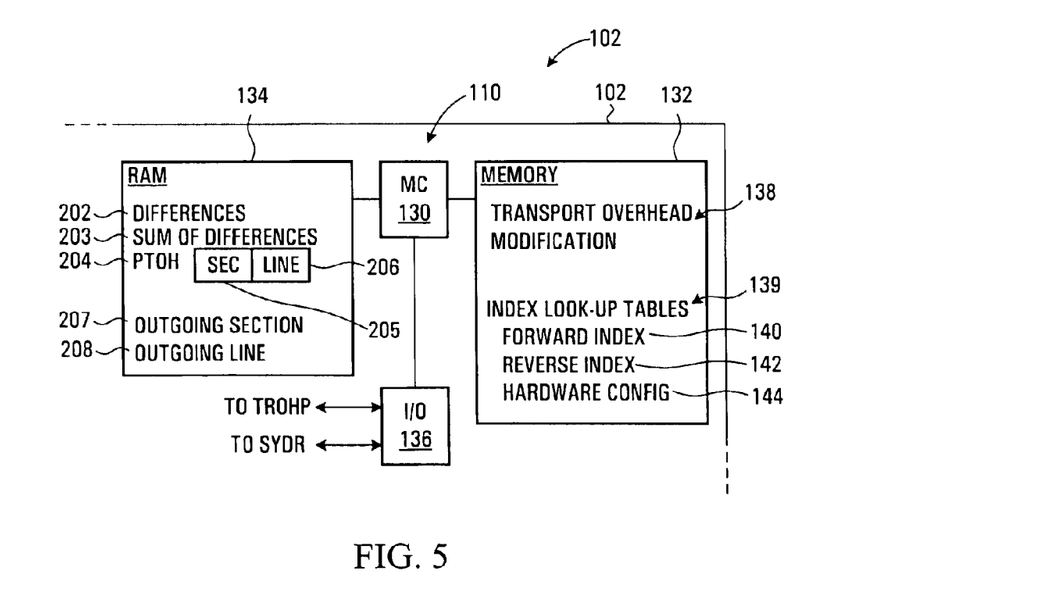
FIG. 5 is a block diagram of a transport control subsystem (TCS) of a second network element shown in FIG. 3.

Referring to FIGS. 3 and 5, the second TCS of the second processor circuit 102 is shown generally at 110 in FIG. 5. In this embodiment, the second TCS 110 includes a second microcontroller 130, in communication with a second program memory 132, a second working memory 134, and a second input/output (I/O) device 136 via which the TCS 110 is in communication with the TROHP 106, the SYDR device 108, and with other components of the network element 64.

The program memory 132, which in this embodiment includes a non-volatile memory such as a FLASH or EEPROM for example, stores various routines, subroutines and threads for execution by the microcontroller 130.

Generally, the program memory 132 acts as a computer-readable medium for providing codes for directing the processor circuit 102 to modify the transport overhead portion 104 of the communication signal 74 received from the network element 64, in response to the PTOH portion 80 of the communication signal indicative of the transport overhead contents 82 of the communication signal prior to arrival at the remote network element 64, and the PPE portion 84 of the communication signal indicative of the path errors 86 present in the communication signal at the remote network element. More particularly, in this embodiment the program memory 132 stores a transport overhead modification thread 138, for directing the processor circuit 102 to modify the transport overhead portion 104 of the communication signal 74 shown in FIG. 3, in response to the PTOH portion 80 and the PPE portion 84. Alternatively, however, any other suitable computer-readable medium may be substituted.

In addition, it will be appreciated that the program memory 132 merely provides one way of generating a signal embodied in a carrier wave, the signal including code segments for directing the processor circuit to modify the transport overhead portion in response to the PTOH and PPE portions in the above manner. Alternatively, other types of media, signals, or ways of generating such signals may be substituted.

In this embodiment, the program memory 132 also stores index look-up tables shown generally at 139, which in this embodiment include a forward index look-up table 140, a reverse index look-up table 142, and a hardware configuration look-up table 144, for use by the microcontroller 130 in executing the transport overhead modification thread 138.

The program memory 132 also stores routines (not shown, not part of this invention) for directing the processor circuit 102 to execute conventional network element functionality such as LTE, ADM and cross-connect functionality, for example.

The routines stored in the program memory 132 direct the processor circuit 102 to define various registers in the second working memory 134, including a differences register 202, a sum of differences register 203, a PTOH register 204 including a previous section overhead field 205 and a previous line overhead field 206, an outgoing section error register 207 and an outgoing line error register 208. Such registers are discussed in greater detail below.

Operation

Referring to FIG. 3, in this embodiment the first and second network elements 64 and 66 are configured, via a manual user provisioning operation, to transport the communication signal 74 received from the first customer equipment 76 to the second customer equipment 98 as a clear channel. (Alternatively, however, if desired, the first and second network elements may be quickly and easily configured by a similar user provisioning operation to transport the communication signal 74 in a conventional (non-clear) manner.)

First Network Element

Referring to FIGS. 3, 4, 6 and 7, the PTOH and PPE insertion thread is shown generally at 128 in FIG. 4. Generally, the PTOH and PPE insertion thread 128 configures the processor circuit 78 to insert the PTOH and PPE portions 80 and 84 into the communication signal 74 shown in FIG. 3, and to transmit the communication signal to a remote device, which in this embodiment is the second network element 66.

Figure 6:
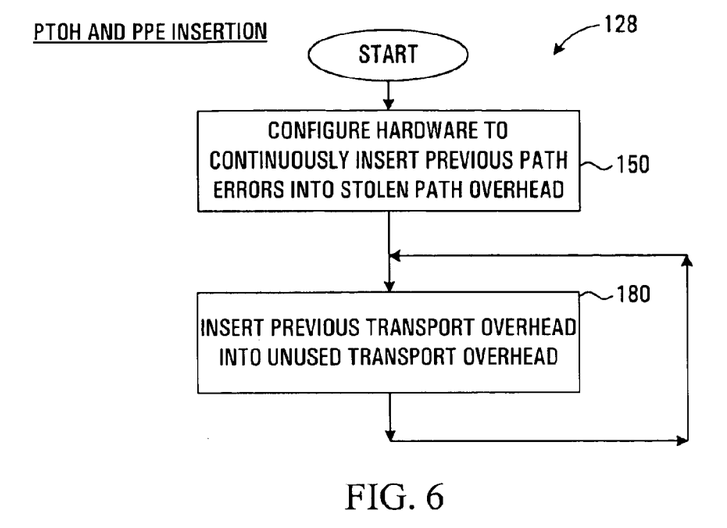
FIG. 6 is a flowchart of a previous transport overhead (PTOH) and previous path error (PPE) insertion thread executed by the TCS shown in FIG. 4.

The PTOH and PPE insertion thread 128 begins with a first block 150 of codes, which generally configures the processor circuit 78 to calculate the PPE portion 84 in response to path parity errors present in the communication signal 74 at the network element 64, and to insert the PPE portion into a path overhead portion of the communication signal, or more particularly, into an unused portion of the path overhead portion. In this embodiment block 150 first directs the microcontroller 120 of the processor circuit 78 to signal the SYDR device 90, in order to configure the SYDR device to insert the PPE portion 84 into the unused path overhead portion of the communication signal 74.

Figure 7:
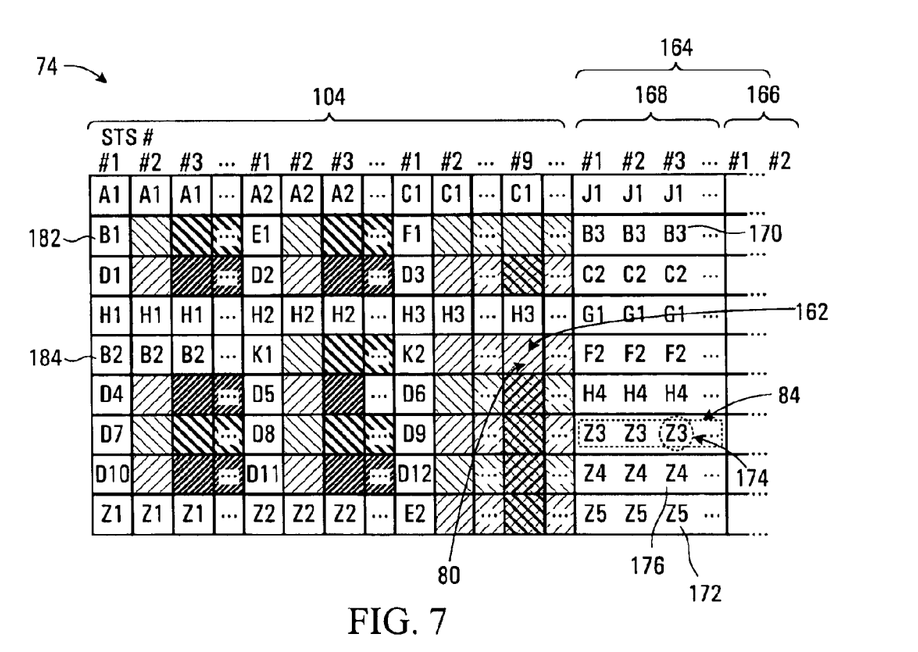
FIG. 7 is a fragmented tabular representation of a communication signal as modified in response to execution of the PTOH and PPE insertion thread shown in FIG. 6.

In this regard, referring to FIGS. 6 and 7, a fragmented representation of the communication signal is shown generally at 74 in FIG. 7. In this embodiment, the communication signal 74 is an OC-48 SONET communication signal, but is illustrated in FIG. 7 with reference to its electrically equivalent Synchronous Transport Signal (STS)-48 signal. More particularly, the communication signal 74 includes the transport overhead (TOH) portion shown generally at 104 and a synchronous payload envelope (SPE) portion shown generally at 164. The SPE 164 includes a payload portion 166 and a path overhead portion 168.

The transport overhead portion 104 includes a plurality of unused transport overhead portions, such as unused transport overhead portions shown generally at 162 represented by shaded regions in FIG. 7, for example. Such shaded regions generally correspond to unused time-slots of transport overhead bytes that are defined only for the first STS-1 component of an STS-N signal, and are not defined for the remaining STS components of the signal. Thus, it is not necessary to terminate any such bytes at section- or line-terminating equipment and accordingly, in the present embodiment, any section- or line-terminating equipment devices interposed on the network 60 between the first and second network elements 64 and 66, are configured to transparently pass such unused time-slot bytes. Similarly, the path overhead portion 168 includes a plurality of unused path overhead portions, such as a plurality of Z3 bytes shown generally at 174 or a plurality of Z4 bytes shown at 176, for example. Although these unused path overhead portions are not unused time-slots, they are nevertheless unused, as the Z3 and Z4 bytes are presently unallocated growth bytes of SONET. It will be appreciated that the entire SPE 164 is transparently passed between the network elements 64 and 66, as there is no path terminating equipment located therebetween.

Referring to FIGS. 3 and 7, it will be appreciated that Tandem Connection Maintenance (TCM) according to the ANSI T1.105.05-1994 standard involves, for each interleaved STS-1 component of an STS-N signal frame, calculating the number of path errors 86 shown in FIG. 3. This is achieved by counting the number of parity errors in the SPE portion 164 of the preceding STS-1 component before scrambling, using a bit interleaved parity 8 code with even parity. In other words, the number of parity errors is counted using the same method that would be used by path originating equipment (not shown) to calculate an initial B3 path error monitoring byte 170 of the path overhead 168. This counted number of parity errors will differ from the B3 byte 170 if any bit errors in the relevant (preceding STS-1) SPE portion 164 have occurred since the signal 74 was initially generated and transmitted by the customer's path originating equipment. Accordingly, the contents of the B3 byte 170 of a given STS-1 component are subtracted from the number of parity errors counted over the previous STS-1 component, to yield the number of path errors 86 present in the previous STS-1 component of the communication signal 74 at the network element 64, or in other words, the number of new parity errors that have arisen in that component between the time the B3 byte was generated at the customer's path originating equipment, and the time the signal 74 arrived at the first network element 64. In this embodiment, it is this latter resulting number of path errors 86 that is to be inserted into the communication signal 74 as the previous path error (PPE) portion 84 shown in FIG. 3.

TCM further involves storing the number of path errors 86 in bits 1–4 of a Z5 byte 172 in the path overhead portion 168. Finally, TCM involves compensating the B3 byte 170, by adjusting the value of the B3 byte to take into account the parity change resulting from writing the number of path errors 86 to the Z5 byte 172.

If desired, block 150 may simply direct the microcontroller 120 of the processor circuit 78 to configure the SYDR device 90 to perform the above-noted conventional TCM steps to insert the number of path errors 86 into the first 4 bits of the Z5 byte 172, with the result that the Z5 byte 172 becomes the PPE portion 84, and to compensate the B3 byte 170 for the parity change resulting from the insertion.

Advantageously, however, in the present embodiment block 150 differs from conventional TCM, in that it configures the processor circuit 78 to insert the PPE portion 84 into at least one of a Z3 and a Z4 byte of a Synchronous Optical NETwork (SONET) path overhead portion. More particularly, in this embodiment block 150 directs the processor circuit 78 to configure the SYDR device 90 to write the number of path errors 86 to a Z3 byte 174 of the path overhead portion 168 rather than to the Z5 byte 172. Thus, in this embodiment the PPE portion 84 includes the Z3 byte 174 following such writing by the SYDR device. In this regard, it is possible that the customer, from whom the OC-48 communication signal 74 is originating, may wish to use the Z5 byte 172 to perform TCM across the customer's own equipment, such as between the first and second customer equipment 76 and 98, for example. Therefore, by writing the number of path errors 86 to the Z3 byte 174 which is presently an unused SONET growth byte, the SPE 164 is effectively transparently passed to the customer (apart from the unused Z3 byte), without interfering with the customer's ability to use path overhead bytes such as Z5 for TCM, for example. Alternatively, block 150 may direct the processor circuit 78 to configure the SYDR device 90 to write the number of path errors 86 to a different byte, such as a Z4 byte 176 which is also presently an unused growth byte, resulting in similar advantages.

In any of the above three variations (i.e., writing the number of path errors 86 to Z5, Z3 or Z4), block 150 further configures the processor circuit 78 to adjust a path parity error portion of the communication signal to compensate for insertion of the PPE portion into the path overhead portion. More particularly, block 150 directs the processor circuit 78 to configure the SYDR device 90 to compensate the B3 byte 170 for the parity change resulting from writing the number of path errors 86 to the path overhead portion 168, in accordance with the TCM standard B3 compensation equation.

Referring to FIGS. 3 and 6, once initially configured in the above manner at block 150, the SYDR device 90 continues to continuously insert the PPE portion 84 into successive frames of the communication signal 74 received at the network element 64. Thus, in this embodiment the PPE insertion is performed by hardware, namely, by the SYDR device. Alternatively, however, software methods, such as a software simulation of TCM to effectively insert the PPE portion for example, may be substituted if desired.

Referring to FIGS. 3, 4, 6 and 7, block 180 then configures the processor circuit 78 to insert the PTOH portion 80 into the transport overhead portion 104 of the communication signal, or more particularly, into the unused portion 162 of the transport overhead portion 104. In this embodiment the unused portion is an unused time-slot of the transport overhead portion 104, such as those described earlier herein in connection with the shaded regions of FIG. 7, for example. More particularly still, in this embodiment the unused time-slot is the STS#9 time-slot of the K2 byte shown in FIG. 7, as discussed in greater detail below. Alternatively, however, one or more other portions of the transport overhead portion may be substituted, although unused portions are preferred for this purpose.

In this embodiment, block 180 achieves such insertion by first directing the microcontroller 120 of the processor circuit 78 to cooperate with the TROHP 88 to insert the PTOH portion 80 into the transport overhead portion 104 of the communication signal 74. In this embodiment the PTOH portion 80 is generated and inserted into the transport overhead portion 104 by software methods, or more particularly, in response to a continuous execution of block 180 by the microcontroller 120. More particularly, in this embodiment block 180 configures the processor circuit 78 to calculate the PTOH portion 80 in response to the previous transport overhead contents 82 of the communication signal 74 prior to its arrival at the first network element 64, over a previous 100 millisecond interval, rather than passing such transport overhead contents directly. Alternatively, however, if suitable hardware components are available, block 180 may direct the microcontroller to configure such hardware components to continuously insert the PTOH portion 80.

In this embodiment, to generate the PTOH portion 80, block 180 first configures the processor circuit 78 to count a number of transport parity errors present in the communication signal 74 prior to its arrival at the network element. More particularly, block 180 directs the microcontroller 120 to sample the contents of the PM binning register 89 of the TROHP 88, once per second, to store a value equal to one-tenth of the contents of the PM binning register 89 in the section errors register 125 of the first working memory 124, and to reset the contents of the PM binning register. Thus, as the PM binning register of the TROHP 88 stores an accumulated number of section parity errors in the incoming communication signal 74 received at the first network element 64, the contents of the section errors register 125 at any given time represents the average number of section parity errors in the incoming communication signal 74 in each of the ten 100 ms sub-intervals in the one-second interval preceding the most recent sampling of the PM binning register 89. As the PM binning register contents are incremented by the TROHP 88 in response to parity discrepancies between the entire contents of a given STS-48 frame of the communication signal 74 and the B1 byte of the subsequent STS-48 frame, the contents of the section errors register 125 are, in that sense, indicative of the previous transport overhead contents 82, or more particularly of the section (B1) parity error bytes of the communication signal 74.

Each time a value equal to one-tenth the sampled contents of the PM binning register 89 is stored in the section errors register 125 in the above manner, block 180 further directs the microcontroller 120 to store a value corresponding to the contents of the section errors register in a section field of the PTOH register 129, for insertion into the transport overhead portion of the communication signal 74. More particularly, if the contents of the section errors register 125 are less than 126, block 180 configures the processor circuit 78 to effectively set the PTOH portion 80 equal to the counted number of transport parity errors (in this example, section parity errors) present in the communication signal prior to its arrival at the first network element 64. More particularly still, block 180 directs the microcontroller 120 to store such contents of the section errors register 125, as a raw section error value, in the section field of the PTOH register 129. If desired, this value may be further "massaged", by rounding it up to the nearest multiple of eight for example, prior to storing it in the section field of the PTOH register. Such massaging may be useful if the TROHP at the second network element 66 is constrained in its ability to corrupt certain numbers of bits in the outgoing communication signal.

However, if the contents of the section errors register 125 are greater than or equal to 126 (i.e. if the most recently sampled PM binning register 89 contents were greater than or equal to 1255), block 180 configures the processor circuit 78 to effectively set the PTOH portion 80 equal to an index value indicative of the counted number of transport parity errors (in this example, section parity errors) present in the communication signal 74 prior to its arrival at the first network element 64. More particularly, block 180 directs the microcontroller 120 to use the contents of the section errors register 125 to search the index look-up table 123, to locate an index number corresponding to such contents, and to store the located index number in the section field of the PTOH register 129. In this regard, Table 1 illustrates an exemplary index look-up table. The middle column showing equivalent bit error rates (BERs) is not used in the present embodiment, but is shown below for illustrative purposes.

TABLE 1

(Exemplary Index Look-up Table 123)

| X = contents of section errors register 125; -or- X = contents of line errors register 127 | Equivalent bit error rate of incoming OC-48 comm. signal 74 (rounded) | Index value (hex) |
|---|---|---|
| 126 ≤ X ≤ 186 | $5 \times 10^{-7}$ | 0D |
| 187 ≤ X ≤ 622 | $1 \times 10^{-6}$ | 0E |
| 623 ≤ X ≤ 1866 | $5 \times 10^{-6}$ | 0F |
| 1867 ≤ X ≤ 6220 | $1 \times 10^{-5}$ | 10 |
| 6221 ≤ X ≤ 18662 | $5 \times 10^{-5}$ | 11 |
| 18663 ≤ X ≤ 62207 | $1 \times 10^{-4}$ | 12 |
| 62208 ≤ X ≤ 186623 | $5 \times 10^{-4}$ | 13 |
| 186624 ≤ X ≤ 622079 | $1 \times 10^{-3}$ | 14 |
| 622080 ≤ X | AIS | FF |

Upon locating the corresponding index number, the microcontroller 120 is directed by block 180 to store the index number in the section field of the PTOH register 129. Alternatively, however, other index tables, or more broadly, any other suitable approximation method may be used to approximate such large error values with a single byte, or as a further alternative, more than one byte of stolen overhead may be used to transport such large error values, if desired.

Similarly, in this embodiment block 180 also configures the processor circuit 78 to count a second number of transport parity errors, or more particularly, line parity errors, present in the communication signal 74 prior to its arrival at the first network element 64. To achieve this, block 180 directs the microcontroller 120 to effectively sample the contents of the signal degrade binning register 91 of the TROHP 88 once every 100 milliseconds, to store the contents of the signal degrade binning register 91 in the line errors register 127 of the first working memory 124, and to reset the contents of the signal degrade binning register. (If desired, the signal degrade binning register 91 may be sampled more frequently, such as three times over each 100 ms interval for example, and the sampled contents may be accumulated in a separate register (not shown) which is copied to the line errors register 127 every 100 ms and is then reset to continue accumulating such more frequent samples.) Thus, as the signal degrade binning register 91 of the TROHP 88 stores an accumulated number of line parity errors in the incoming communication signal 74 received at the first network element 64, the contents of the line errors register 127 at any given time represents the total number of line parity errors in the incoming communication signal 74 in the 100 ms interval preceding the most recent sampling of the signal degrade binning register. As the signal degrade binning register contents are incremented by the TROHP 88 in response to parity discrepancies between the line overhead and synchronous payload envelope of a given STS-1 component of an STS-48 frame of the communication signal 74 and the B2 byte of the subsequent STS-1 component, the contents of the line errors register 127 are, in that sense, indicative of the previous transport overhead contents 82, or more particularly of the line (B2) parity error bytes of the communication signal 74.

Each time the line errors register 127 is updated in the above manner in response to the sampled contents of the signal degrade binning register 91 over a given 100 ms interval, block 180 further directs the microcontroller 120 to store a value corresponding to the contents of the line errors register in a line field of the PTOH register 129, for insertion into the transport overhead portion of the communication signal 74. More particularly, if the contents of the line errors register 127 are less than 126, block 180 configures the processor circuit 87 to effectively set the PTOH portion 80 equal to the counted number of transport parity errors (in this example, line parity errors) present in the communication signal 74 prior to arrival at the first network element 64. To achieve this, block 180 directs the microcontroller 120 to store such contents of the line errors register 127, as a raw line error value, in the line field of the PTOH register 129. As with the section field, the contents of the line errors register 127 may be "massaged" if desired, by rounding such contents up to the nearest multiple of eight for example, prior to storing such contents in the line field of the PTOH register 129.

However, if the contents of the line errors register 127 are greater than or equal to 126, block 180 configures the processor circuit 78 to effectively set the PTOH portion 80 equal to an index value indicative of the counted number of transport parity errors (in this example, line parity errors). More particularly, block 180 directs the microcontroller 120 to use the contents to search the index look-up table 123 shown in Table 1 above, to locate an index number corresponding to the value, and to store the located index number in the section field of the PTOH register 129.

Upon locating the corresponding index number, the microcontroller 120 is directed by block 180 to store the index number in the line field of the PTOH register 129.

In addition, block 180 directs the microcontroller 120 to cooperate with the TROHP to insert the contents of the PTOH register 129 into the unused portion 162 of the transport overhead portion of the communication signal 74. More particularly, in this embodiment, block 180 directs the microcontroller 120 to effectively transmit the contents of the section field and the line field of the PTOH register 129 ten times per second, in a sufficiently slow manner as to be detectable by software at the second network element 66, as follows.

In this regard, block 180 configures the processor circuit 78 to insert a PTOH header value in the communication signal, preceding the PTOH portion 80, to identify the PTOH portion. More particularly, within each successive 100 ms interval, block 180 directs the microcontroller 120 to cooperate with the TROHP 88 to insert a unique B2 header byte into the STS#9 time-slot of the K2 byte for a first sub-interval of 25 ms (or in other words, for 200 successive frames). In this embodiment, the unique B2 header byte is obtained from the PTOH header values register 122, and serves to indicate to the second network element 66 that the byte that is to follow in the next 25 ms sub-interval is a previous transport overhead portion, indicative of previous line (B2) parity error contents of the communication signal 74 prior to its arrival at the first network element 64. Block 180 then directs the microcontroller 120 to cooperate with the TROHP 88 to insert the contents of the line field of the PTOH register 129 into the STS#9 time-slot of the K2 byte for a second sub-interval of 25 ms (i.e. for the next 200 successive data frames). This allows sufficient time for the contents of the line field to be detected at the second network element 66.

Similarly, block 180 then directs the microcontroller 120 to cooperate with the TROHP 88 to insert a unique B1 header byte into the STS#9 time-slot of the K2 byte for a third sub-interval of 25 ms (i.e. for the next 200 successive frames). In this embodiment, the unique B1 header byte is obtained from the PTOH header values register 122, and serves to indicate to the second network element 66 that the byte that is to follow in the next 25 ms sub-interval is a previous transport overhead portion, indicative of previous section (B1) parity error contents of the communication signal 74 prior to its arrival at the first network element 64. Block 180 then directs the microcontroller 120 to cooperate with the TROHP 88 to insert the contents of the section field of the PTOH register 129 into the STS#9 time-slot of the K2 byte for a fourth sub-interval of 25 ms (i.e. for the next 200 successive data frames).

In this embodiment, block 180 continues to direct the microcontroller 120 to insert the PTOH portion 80, or more particularly, the contents of the PTOH register 129, into the STS#9 time-slot of the K2 byte of the communication signal 74 in the above manner, repeating the above four-part cycle once every 100 ms. Similarly, block 180 continues to direct the microcontroller to sample the contents of the PM binning register 89 once per second and to sample the contents of the signal degrade binning register 91 effectively once every 100 ms (or alternatively, more often), and to update the contents of the section errors register 125, the line errors register 127, and the section and line fields of the PTOH register 129, thereby updating the PTOH portion 80 inserted into the communication signal 74, as described above. Block 180 is thus executed indefinitely, as a thread, by the microcontroller 120.

The communication signal 74, which in this embodiment is an OC-48 signal, including the PTOH and PPE portions 80 and 84, is byte-interleave-multiplexed by the network element 64 into an OC-192 signal which is transmitted on the network 60 by the transmitter 87 of the first network element 64. The PTOH portion 80 and the PPE portion 84 are transparently passed through any network elements 68 such as LTEs for example on the network 60, as the PPE portion is stored in the synchronous payload envelope 164 which is always carried transparently through non-path-terminating elements, and the intervening network elements 68 are configured to transparently pass the unused portion 162 (or more particularly, the unused OC#9 time-slot of the K2 bytes) of the transport overhead portion 104, in which the PTOH portion 80 is stored. In this embodiment, the communication signal 74 is multiplexed into an OC-192 signal comprising other communication signals that are not to be provided as clear channels. Alternatively, however, as no special dedicated facilities are required in the present embodiment, any desired mixture of clear channel and non-clear channel communication signals may be multiplexed together as desired.

Second Network Element

Referring to FIGS. 3, 5, 7 and 8, upon arrival at the second network element 66 of the communication signal 74, as a multiplexed component of the OC-192 signal transmitted by the first network element 64, the communication signal 74 is demultiplexed from the OC-192 signal. Advantageously, in the present embodiment, as dedicated clear channel facilities are not required, the communication signal 74 is demultiplexed from the OC-192 signal in the same manner that non-clear channels are customarily demultiplexed, without the need to demultiplex the entire OC-192 signal and re-multiplex the signal components that are not being dropped off at the second network element 66. At the second network element 66, as the communication signal 74 is demultiplexed, the processor circuit 102 of the second network element commences execution of the transport overhead modification thread 138 shown in FIG. 8.

Figure 8:
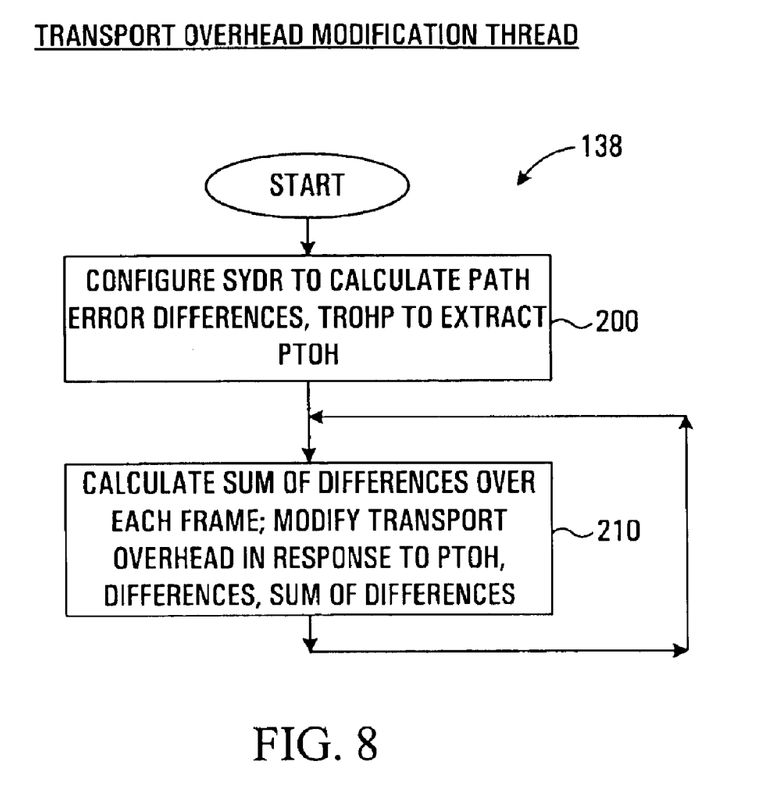
FIG. 8 is a flowchart of a transport overhead modification thread executed by the TCS shown in FIG. 5.

The transport overhead modification thread begins with a first block 200 of codes, which configures the processor circuit 102 to calculate a difference between path errors present in the communication signal 74, and the path errors 86 that were present in the communication signal at the remote first network element 64. More particularly, in this embodiment, block 200 configures the processor circuit 102 to calculate such a difference for each payload portion having valid path overhead in the communication signal 74. Thus, for example, if the communication signal 74 includes a plurality of STS-1 component signals, block 200 directs the microcontroller 130 to configure the processor circuit 102, or more particularly the SYDR device 108, to calculate, for each of the STS-1 component signals, a difference between path errors present in the STS-1 component signal and the path errors 86 that were present in the STS-1 component signal at the remote first network element 64. Alternatively, if the communication signal 74 includes a plurality of concatenated payloads in respective concatenated STS-nc component signals, it will be appreciated that only the first STS-1c subcomponent of each STS-nc component signal (for example, STS#1, #13, #25 and #37 if the STS-48 communication signal 74 includes four STS-12c component signals) will have valid path overhead and accordingly, block 200 directs the microcontroller to configure the SYDR device 108 to calculate such a difference value only for the first such STS-1c subcomponent of each STS-nc component signal. For ease of illustration, however, the following discussion focuses primarily on the non-concatenated example in which the communication signal 74 includes non-concatenated STS-1 component signals.

In this regard, it will be appreciated that conventional TCM functionality at a tandem connection termination equipment (TCTE) such as the second network element 66, involves, for each STS-1 component of the communication signal 74, re-calculating the number of parity errors present in the SPE portion 164 of the previous STS-1 component. The contents of the B3 byte 170 of the current STS-1 component are then subtracted from this re-calculated number of parity errors over the previous component, to yield the number of path errors present in the previous STS-1 component of the signal 74 upon its arrival at the TCTE, or in other words, the number of bit errors that have occurred in the SPE 164 of the previous STS-1 component since the communication signal 74 was initially generated and transmitted by the customer's path originating equipment. A difference between this number of path errors present in the signal 74 at the TCTE, and the number of path errors 86 that were present in the signal 74 at the tandem connection originating (TCO) point (in this embodiment, the first network element 64) is then calculated. In this regard, it will be recalled that the number of path errors 86 present at the TCO is stored in the first 4 bits of the Z5 byte 172 according to conventional TCM, and therefore, this difference is calculated by subtracting the contents of the first 4 bits of the Z5 byte from the number of path errors present in the signal 74 at the TCTE. The magnitude of this difference represents the number of new path errors that occurred in the previous STS-1 SPE 164 along its journey between the TCO and the TCTE. The TCTE then records this value for network monitoring purposes, resets the first 4 bits of the Z5 byte 172 to zeroes, and compensates the B3 byte 170 to account for the parity change resulting from this resetting.

Accordingly, referring to FIGS. 3, 5, 6, 7 and 8, if block 150 of the PTOH and PPE insertion thread 128 shown in FIG. 6 configured the processor circuit 78 to insert the PPE portion 84 into the Z5 byte 172 in the same manner as a conventional TCO element, then similarly, block 200 of the transport overhead modification thread 138 would configure the processor circuit 102 to calculate such difference values in the same manner as a conventional TCTE.

However, as noted, in the present embodiment block 150 of the PTOH and PPE insertion thread 128 configures the processor circuit 78 to insert the number of path errors 86 into the Z3 byte 174 (or alternatively, the Z4 byte 176) rather than the Z5 byte 172. Accordingly, in the present embodiment block 200 of the transport overhead modification thread 138 directs the microcontroller 130 to configure the SYDR device 108 to calculate the difference values by, for each STS-1 component, subtracting the contents of the first 4 bits of the Z3 byte 174 (or alternatively, of the Z4 byte 176) rather than of the Z5 byte 172, from the number of path errors present in the previous STS-1 component at the second network element 66. Similarly, rather than resetting the first 4 bits of the Z5 byte, block 150 configures the processor circuit 102 to reset the first 4 bits of the Z3 byte 174 (or alternatively the Z4 byte 176), and to compensate the B3 byte for the resulting parity change. Advantageously, therefore, if the customer who supplied the communication signal 74 is attempting to use the Z5 (or N1) bytes 172 to perform TCM between points on his own facilities, the customer's ability to do so will not be destroyed, as the present embodiment does not involve any modifications to the Z5 byte at all over the network 60.

Once configured in this manner at block 200, the SYDR device 108 continuously calculates difference values in the above manner and continuously provides signals representing such values to the microcontroller 130. Thus, in this embodiment the TCM calculations at the second network element 66 are also performed by hardware, namely the SYDR device 108. Alternatively, however, software-simulated TCM may be substituted if desired.

Referring to FIGS. 3, 5, 7 and 8, block 210 then configures the processor circuit 102 to calculate a sum of the differences of each of the component signals. To achieve this, block 210 directs the microcontroller 130 to receive the signals from the SYDR device 108 representing the difference value (described above in connection with block 200) for each of the 48 STS-1 components of each STS-48 signal, and to store such values in the differences register 202 in the second working memory 134. Block 210 further directs the microcontroller 130 to maintain a sum of the difference values in the sum of differences register 203. In this embodiment, the difference values are collected from the SYDR device 108 once per second, and a sum of differences is calculated over each such collected set of difference values. The sum of differences, which represents the total number of new path parity errors produced in the communication signal 74 during the course of its voyage between the first and second network elements 64 and 66 over a one-second interval, is then divided by ten, to produce an average sum of differences value over each 100 ms sub-interval. (It will be recalled that this 100 ms sub-interval is the same duration of sub-interval as that over which the PTOH portion 80, which was inserted into the communication signal 74 at the first network element 64, was calculated. Accordingly, it is desirable to divide the sum of differences by ten in this manner so that the sum of differences is effectively calculated over the same duration of time interval as the PTOH portion 80.) The result of such division is stored in the sum of differences register 203. Thus, in the present embodiment, the contents of the sum of differences register 203 are updated once every second, but correspond to an average sum of difference values over each 100 ms time interval in the preceding second. Alternatively, however, the sum of differences register 203 may be updated more or less frequently if desired.

In addition, referring to FIGS. 3 to 8, block 210 directs the microcontroller 130 to cooperate with the TROHP 106 to begin continuously extracting the PTOH portion 80 stored in the unused transport overhead portion 162 of the communication signal 74. In this embodiment, such continuous monitoring and extraction of the PTOH portion 80 is achieved in a 100 ms four-part cycle consisting of four 25 ms sub-intervals, corresponding to the four-part cycle described above in connection with block 180 at the first network element 64.

In this regard, block 210 first directs the microcontroller 130 to cooperate with the TROHP 106 to monitor the contents of the STS#9 time-slot of the K2 byte of the communication signal 74. Upon detecting the presence of the unique B2 header value in this STS#9 time-slot, block 210 directs the microcontroller 130 to continue to monitor the K2 STS#9 time-slot of the communication signal until a byte other than the unique B2 header value is detected. Upon detecting such a byte, if the byte represents a raw line error value less than 126, as described above in connection with block 180, block 210 directs the microcontroller 130 to copy the byte into the previous line overhead field 206 of the PTOH register 204. Alternatively, if the detected byte represents a line error index value as described in connection with Table 1 above, block 210 directs the microcontroller 130 to use the index value byte to search the reverse index look-up table 142, to extract an approximated line error count value corresponding to the detected byte. In this regard, the reverse index look-up table 142 is similar to a reverse of the index look-up table 123 shown in Table 1 above, but provides a single average or approximated error count value (rather than a range of error count values) corresponding to each index value. Block 210 then directs the microcontroller 130 to store the located approximated error count value in the previous line overhead field 206 of the PTOH register 204.

Block 210 then directs the microcontroller 130 to cooperate with the TROHP 106 to continue monitoring the contents of the STS#9 time-slot of the K2 byte of the communication signal 74. Upon detecting the presence of the unique B1 header value in this STS#9 time-slot, block 210 directs the microcontroller 130 to continue to monitor the K2 STS#9 time-slot of the communication signal until a byte other than the unique B1 header value is detected. Upon detecting such a byte, if the byte represents a raw section error value less than 126, as described above in connection with block 180, block 210 directs the microcontroller 130 to copy the byte into the previous section overhead field 205 of the PTOH register 204. Alternatively, if the detected byte represents a section error index value as described in connection with Table 1 above, block 210 directs the microcontroller 130 to use the index value byte to search the reverse index look-up table 142, to locate and extract an approximated error count value corresponding to the detected section error index value byte. Block 210 then directs the microcontroller 130 to store the located approximated error count value in the previous section overhead field 205 of the PTOH register 204.

Block 210 further directs the microcontroller 130 to continuously monitor the K2 STS#9 time-slot as indicated in the preceding two paragraphs, to continuously extract the PTOH portion 80, and to store corresponding line and section error values in the previous line and section overhead fields 206 and 205 respectively as described above.

Block 210 further configures the processor circuit 102 to modify the transport overhead portion 104 of the communication signal 74, in response to the extracted PTOH and PPE portions 80 and 84. More particularly, in this embodiment block 210 configures the processor circuit to adjust the transport overhead portion 104 in response to a sum of at least some contents of the PTOH portion plus the sum of differences value stored in the sum of differences register 203.

In this embodiment, block 210 achieves this by directing the microcontroller 130 to add the contents of the sum of differences register 203 to the contents of the previous section overhead field 205, and to store the resulting value in the outgoing section error register 207. If desired, this resulting value may be "massaged", by rounding it up to the nearest multiple of eight for example, prior to storing it in the outgoing section error register 207. As noted, such massaging may be useful if the TROHP 106 is constrained in its ability to corrupt certain numbers of bits in the outgoing communication signal.

If the contents of the outgoing section error register 207 are less than 126, block 210 directs the microcontroller 130 to use the contents of the outgoing section error register 207 to locate a corresponding record in the hardware configuration look-up table 144, to look up register configurations of the TROHP 106 that must be implemented in order to invert bits of the B1 section parity error bytes of the transport overhead portion 104 of the outgoing communication signal 74, to effectively simulate a bit error count over a 100 ms interval equivalent to the contents of the outgoing section error register 207. In this regard, it will be appreciated that typical TROHP ASICs will have the ability, for diagnostic purposes, to invert certain bits of transport overhead, such as inverting one bit or all bits, of a single B1 or B2 byte, of all B2 bytes in a frame, or of all B1 or B2 bytes over a given number of frames, for example. Thus, the particular register configuration addresses and values stored in the hardware configuration look-up table 144 are dependent upon the make and model of the particular TROHP ASIC used, and will vary from ASIC to ASIC. Upon locating the hardware configuration look-up table record corresponding to the contents of the outgoing section error register 207, block 210 directs the microcontroller 130 to set the relevant register configurations of the TROHP 106 in accordance with the located record, to invert an appropriate number of bits of an appropriate number of B1 section parity error bytes to simulate an outgoing error rate equivalent to the error count value stored in the outgoing section error register over a 100 ms interval.

Similarly, if the contents of the outgoing section error register 207 are greater than or equal to 126, block 210 directs the microcontroller 130 to use the contents of the outgoing section error register 207 to locate a corresponding index value in the forward index look-up table 140. In this embodiment, the forward index look-up table 140 is identical to the index lookup table 123, shown as Table 1 above. Block 210 then directs the microcontroller to use the located index value to look up a corresponding hardware configuration record in the hardware configuration look-up table 144, to look up register configurations of the TROHP 106 that must be implemented in order to invert bits of the B1 section error bytes of the transport overhead portion 104 of the outgoing communication signal 74, to effectively simulate a bit error rate over a 100 ms interval equivalent to the bit error rate corresponding to the index value that corresponds to the contents of the outgoing section error register 207 (see Table 1 above). The microcontroller is then directed to set such register contents of the TROHP in accordance with the located record.

In addition, block 210 configures the processor circuit 102 to further modify the transport overhead portion 104 of the outgoing communication signal 74, by adjusting B2 line parity error bytes thereof. More particularly, block 210 directs the microcontroller 130 to add the contents of the sum of differences register 203 to the contents of the previous line overhead field 206, and to store the resulting value in the outgoing line error register 208. As discussed in connection with the outgoing section error register, if desired, this resulting value may be "massaged", by rounding it up to the nearest multiple of eight for example, prior to storing it in the outgoing line error register 207.

If the contents of the outgoing line error register 208 are less than 126, block 210 directs the microcontroller 130 to use the contents of the outgoing line error register 208 to locate a corresponding record in the hardware configuration lookup table 144, to look up register configurations of the TROHP 106 that must be implemented in order to invert bits of the B2 line parity error bytes of the transport overhead portion 104 of the outgoing communication signal 74, to effectively simulate a bit error count over a 100 ms interval equivalent to the contents of the outgoing line error register 208. Upon locating the hardware configuration look-up table record corresponding to the contents of the outgoing line error register 208, block 210 directs the microcontroller 130 to set the relevant register configurations of the TROHP 106 in accordance with the located record, to invert an appropriate number of bits of an appropriate number of B2 line parity error bytes to simulate an outgoing error rate equivalent to the error count value stored in the outgoing line error register over a 100 ms interval.

Similarly, if the contents of the outgoing line error register 208 are greater than or equal to 126, block 210 directs the microcontroller 130 to use the contents of the outgoing line error register 208 to locate a corresponding index value in the forward index look-up table 140. Block 210 then directs the microcontroller to use the located index value to look up a corresponding hardware configuration record in the hardware configuration look-up table 144, to look up register configurations of the TROHP 106 that must be implemented in order to invert bits of the B2 line parity error bytes of the transport overhead portion 104 of the outgoing communication signal 74, to effectively simulate a bit error rate over a 100 ms interval equivalent to the bit error rate corresponding to the index value that corresponds to the contents of the outgoing line error register 208 (see Table 1 above). The microcontroller is then directed to set such register contents of the TROHP in accordance with the located record.

Block 210 continues to direct the processor circuit 102 to modify transport overhead bytes of the outgoing communication signal 74 in the above manner indefinitely, executed as a thread at the microcontroller 130.

Thus, referring back to FIG. 3, it will be appreciated that as a result of the execution of the transport overhead modification thread, a clear channel has effectively been provided across a segment of the network extending from the first network element 64 to the second network element 66.

For example, if new payload or path errors are being generated on the optical pipe 72, or more generally, in any stretch of the customer's equipment lying between the customer's last section- or line-terminating equipment prior to the first network element 64, then without the clear channel provided by the present embodiment, the customer would not have been able to detect such errors at the second customer equipment 98 for example, as the relevant B1 and B2 section and line overhead bytes would have been erased and regenerated by various STEs and LTEs on the network 60, including the first and second network elements 64 and 66 and various elements therebetween. The customer would not have been able to detect such errors until arrival of the communication signal 74 at the customer's path-terminating equipment, at which point the customer would not have any information as to the location along the path where such errors occurred.

In accordance with the present embodiment of the invention, however, the B1 and B2 bytes of the outgoing communication signal 74 transmitted from the second network element 66 have been modified, to simulate, for error preservation purposes, the effects that would have occurred if the original transport overhead contents 82 had been transparently passed through the network 60 and had been adjusted to compensate for any path errors that may have occurred on the network 60, to further enhance such transparency. For example, if path errors were occurring at an average rate of 40 errors per 100 ms over the network 60, the B2 bytes and B1 bytes of the outgoing communication signal 74 transmitted from the second network element 66, as a result of the addition of the contents of the sum of differences register 203 to the reconstructed previous section and line overhead fields 205 and 206 as discussed above, are effectively adjusted to compensate for the new path errors: the new path errors produce new parity errors, but the B1 and B2 bytes are also incremented to account for the new parity errors, so that any downstream equipment counting the number of parity errors will not, on average, detect any discrepancy between the counted number of parity errors and the expected number (B1 or B2) of parity errors. Accordingly, these path errors on the network 60 do not, on average, result in any section or line error alarms at the second customer equipment 98 (although path errors would ultimately be detected at the path terminating equipment).

However, if in addition to these path errors occurring on the network 60, an average of 80 path or payload errors per 100 ms were occurring on the optical pipe 72 prior to arrival at the first network element 64, these errors would not be reflected in the sum of differences values added to the reconstructed previous section and line overhead fields 205 and 206. Therefore, by adjusting the outgoing B1 and B2 bytes produced at the second network element 66 in response to the previous section and line overhead fields 205 and 206, the outgoing B1 and B2 bytes mimic the effect of the original B1 and B2 bytes received at the first network element 64, so that on average, the values of the outgoing B1 and B2 bytes will differ from the actual counted number of section and line parity errors, by a rate equivalent to the rate at which the errors are occurring on the optical pipe 72. Accordingly, when the outgoing signal 74 produced by the second network element 66 arrives at the second customer equipment 98, these errors trigger section error alarms and/or line error alarms, depending on whether the equipment 98 is both an STE and an LTE, indicative of an average parity bit error rate of approximately 80 errors per 100 ms.

Therefore, from the customers point of view, in terms of the customers ability to detect section and line errors on the customers equipment, it is as if the network 60 and all the various LTEs and STEs therein did not exist, and the optical pipe 72 was connected directly to the optical pipe 96 shown in FIG. 3.

Alternatives

Although in the foregoing embodiment, the PPE portion 84 was described as having been inserted into and extracted out of the communication signal 74 by hardware (the SYDR devices 90 and 108), alternatively, a similar variation of TCM may be simulated with appropriate software if desired. Similarly, although the PTOH portion 80 was described as having been inserted into and extracted from the communication signal 74 by the execution of software, alternatively, if suitable hardware is available, the insertion and extraction of the PTOH portion may be carried out by such hardware. Depending on the configurations of such hardware, variations in the nature of the PTOH portion to more closely approximate or equal the original transport overhead contents 82 (B1 and B2) may be implemented.

Likewise, although the modification of the transport overhead portion 104 of the outgoing communication signal 74 in response to the PTOH and PPE portions was described as having been implemented through the execution of software in combination with hardware, alternatively, such modification may be accomplished through hardware alone. It will be appreciated that such hardware, in combination with hardware for extracting the PTOH portion 80, may be capable of more refined modifications of the outgoing B1 and B2 bytes of the transport overhead portion 104, involving, for example, a more selective modification of individual B1 and B2 bytes, resulting in further enhanced transparency, with reduced or eliminated frame delay.

In addition, it will be appreciated from the foregoing that the methods described above for calculating, inserting and extracting the PTOH portion 80 are merely one example of simulating or approximating the effects of transparent passage through the network 80 of the original B1 and B2 bytes of the incoming transport overhead contents 82. Alternatively, other suitable simulation, approximation or transparency methods may be substituted.

More generally, while specific embodiments of the invention have been described and illustrated, such embodiments should be considered illustrative of the invention only and not as limiting the invention as construed in accordance with the accompanying claims.

What is claimed is:

1. A method of providing clear channel access on a network, the method comprising:
    a) receiving a communication signal from a remote network element, said communication signal comprising a previous transport overhead (PTOH) portion indicative of transport overhead contents of said communication signal prior to arrival at said remote network element, and a previous path error (PPE) portion indicative of path errors present in said communication signal at said remote network element; and
    b) modifying a transport overhead portion of said communication signal in response to said PTOH and PPE portions.

2. The method of claim 1 wherein modifying comprises calculating a difference between path errors present in said communication signal, and said path errors present in said communication signal at said remote network element.

3. The method of claim 1 wherein said communication signal comprises a plurality of component signals and wherein modifying comprises calculating, for each of said component signals, a difference between path errors present in said component signal and path errors present in said component signal at said remote network element.

4. The method of claim 3 wherein modifying further comprises calculating a sum of said differences of each of said component signals.

5. The method of claim 4 wherein modifying further comprises adding said sum of said differences to at least some contents of said PTOH portion.

6. The method of claim 4 wherein modifying further comprises adjusting said transport overhead portion in response to a sum of at least some contents of said PTOH portion plus said sum of said differences.

7. An apparatus for providing clear channel access on a network, the apparatus comprising:
    a) a receiver operable to receive a communication signal from a remote network element, said communication signal comprising a previous transport overhead (PTOH) portion indicative of transport overhead contents of said communication signal prior to arrival at said remote network element, and a previous path error (PPE) portion indicative of path errors present in said communication signal at said remote network element; and
    b) a processor circuit in communication with said receiver and configured to modify a transport overhead portion of said communication signal in response to said PTOH and PPE portions.

8. The apparatus of claim 7 wherein said processor circuit is configured to calculate a difference between path errors present in said communication signal, and said path errors present in said communication signal at said remote network element.

9. The apparatus of claim 7 wherein said communication signal comprises a plurality of component signals, and wherein said processor circuit is configured to calculate, for each of said component signals, a difference between path errors present in said component signal and path errors present in said component signal at said remote network element.

10. The apparatus of claim 9 wherein said processor circuit is configured to calculate a sum of said differences of each of said component signals.

11. The apparatus of claim 10 wherein said processor circuit is configured to add said sum of said differences to at least some contents of said PTOH portion.

12. The apparatus of claim 10 wherein said processor circuit is configured to adjust said transport overhead portion in response to a sum of at least some contents of said PTOH portion plus said sum of said differences.

13. An apparatus for providing clear channel access on a network, the apparatus comprising:
    a) means for receiving a communication signal from a remote network element, said communication signal comprising a previous transport overhead (PTOH) portion indicative of transport overhead contents of said communication signal prior to arrival at said remote network element, and a previous path error (PPE) portion indicative of path errors present in said communication signal at said remote network element; and b) means for modifying a transport overhead portion of said communication signal in response to said PTOH and PPE portions.

14. A computer-readable medium for providing codes for directing a processor circuit to modify a transport overhead portion of a communication signal received from a network element, in response to a previous transport overhead (PTOH) portion of said communication signal indicative of transport overhead contents of said communication signal prior to arrival at said remote network element, and a previous path error (PPE) portion of said communication signal indicative of path errors present in said communication signal at said remote network element.

15. A signal embodied in a carrier wave, the signal comprising code segments for directing a processor circuit to modify a transport overhead portion of a communication signal received from a network element, in response to a previous transport overhead (PTOH) portion of said communication signal indicative of transport overhead contents of said communication signal prior to arrival at said remote network element, and a previous path error (PPE) portion of said communication signal indicative of path errors present in said communication signal at said remote network element.

16. A method of providing clear channel access on a network, the method comprising:

a) inserting into a communication signal received at a network element, a previous transport overhead (PTOH) portion indicative of transport overhead contents of said communication signal prior to arrival at said network element, and a previous path error (PPE) portion indicative of path errors present in said communication signal at said network element; and b) transmitting said communication signal to a remote device.

17. The method of claim 16 wherein inserting said PPE portion comprises calculating said PPE portion in response to path parity errors present in said communication signal at said network element.

18. The method of claim 16 wherein inserting said PPE portion comprises inserting said PPE portion into a path overhead portion of said communication signal.

19. The method of claim 18 wherein inserting said PPE portion further comprises adjusting a path parity error portion of said communication signal to compensate for insertion of said PPE portion into said path overhead portion.

20. The method of claim 18 wherein inserting said PPE portion comprises inserting said PPE portion into an unused portion of said path overhead portion.

21. The method of claim 18 wherein inserting said PPE portion comprises inserting said PPE portion into at least one of a Z3 and a Z4 byte of a Synchronous Optical NETwork (SONET) path overhead portion.

22. The method of claim 16 wherein inserting said PTOH portion comprises inserting said PTOH portion into a transport overhead portion of said communication signal.

23. The method of claim 22 wherein inserting said PTOH portion comprises inserting said PTOH portion into an unused portion of said transport overhead portion.

24. The method of claim 22 wherein inserting said PTOH portion comprises inserting said PTOH portion into an unused time-slot of said transport overhead portion.

25. The method of claim 16 further comprising calculating said PTOH portion in response to said transport overhead contents of said communication signal prior to arrival at said network element.

26. The method of claim 25 wherein calculating comprises counting a number of transport parity errors present in said communication signal prior to arrival at said network element.

27. The method of claim 26 wherein calculating comprises setting said PTOH portion equal to said counted number of transport parity errors present in said communication signal prior to arrival at said network element.

28. The method of claim 26 wherein calculating comprises setting said PTOH portion equal to an index value indicative of said counted number of transport parity errors present in said communication signal prior to arrival at said network element.

29. The method of claim 16 further comprising inserting a PTOH header value in said communication signal preceding said PTOH portion, to identify said PTOH portion.

30. The method of claim 16 further comprising:

a) receiving said communication signal at said remote device, said communication signal comprising said PTOH portion and said PPE portion; and b) modifying a transport overhead portion of said communication signal in response to said PTOH and PPE portions.

31. An apparatus for providing clear channel access on a network, the apparatus comprising:

a) a processor circuit configured to insert into a communication signal received at a network element, a previous transport overhead (PTOH) portion indicative of transport overhead contents of said communication signal prior to arrival at said network element, and a previous path error (PPE) portion indicative of path errors present in said communication signal at said network element; and b) a transmitter in communication with said processor circuit and operable to transmit said communication signal to a remote device.

32. The apparatus of claim 31 wherein said processor circuit is configured to calculate said PPE portion in response to path parity errors present in said communication signal at said network element.

33. The apparatus of claim 31 wherein said processor circuit is configured to insert said PPE portion into a path overhead portion of said communication signal.

34. The apparatus of claim 33 wherein said processor circuit is configured to adjust a path parity error portion of said communication signal to compensate for insertion of said PPE portion into said path overhead portion.

35. The apparatus of claim 33 wherein said processor circuit is configured to insert said PPE portion into an unused portion of said path overhead portion.

36. The apparatus of claim 33 wherein said processor circuit is configured to insert said PPE portion into at least one of a Z3 and a Z4 byte of a Synchronous Optical NETwork (SONET) path overhead portion.

37. The apparatus of claim 31 wherein said processor circuit is configured to insert said PTOH portion into a transport overhead portion of said communication signal.

38. The apparatus of claim 37 wherein said processor circuit is configured to insert said PTOH portion into an unused portion of said transport overhead portion.

39. The apparatus of claim 37 wherein said processor circuit is configured to insert said PTOH portion into an unused time-slot of said transport overhead portion.

40. The apparatus of claim 31 wherein said processor circuit is configured to calculate said PTOH portion in response to said transport overhead contents of said communication signal prior to arrival at said network element.

41. The apparatus of claim 40 wherein said processor circuit is configured to count a number of transport parity errors present in said communication signal prior to arrival at said network element.

42. The apparatus of claim 41 wherein said processor circuit is configured to set said PTOH portion equal to said counted number of transport parity errors present in said communication signal prior to arrival at said network element.

43. The apparatus of claim 41 wherein said processor circuit is configured to set said PTOH portion equal to an index value indicative of said counted number of transport parity errors present in said communication signal prior to arrival at said network element.

44. The apparatus of claim 31 wherein said processor circuit is configured to insert a PTOH header value in said communication signal preceding said PTOH portion, to identify said PTOH portion.

45. A system comprising the apparatus of claim 31 and further comprising said remote device, said remote device comprising:
   a) a receiver operable to receive said communication signal comprising said PTOH portion and said PPE portion; and
   b) a processor circuit in communication with said receiver and configured to modify a transport overhead portion of said communication signal in response to said PTOH and PPE portions.

46. An apparatus for providing clear channel access on a network, the apparatus comprising:
   a) means for inserting into a communication signal received at a network element, a previous transport overhead (PTOH) portion indicative of transport overhead contents of said communication signal prior to arrival at said network element, and a previous path error (PPE) portion indicative of path errors present in said communication signal at said network element; and
   b) means for transmitting said communication signal to a remote device.

47. A computer-readable medium for providing codes for directing a processor circuit to:
   a) insert into a communication signal received at a network element, a previous transport overhead (PTOH) portion indicative of transport overhead contents of said communication signal prior to arrival at said network element, and a previous path error (PPE) portion indicative of path errors present in said communication signal at said network element; and
   b) transmit said communication signal to a remote device.

48. A signal embodied in a carrier wave, the signal comprising code segments for directing a processor circuit to:
   a) insert into a communication signal received at a network element, a previous transport overhead (PTOH) portion indicative of transport overhead contents of said communication signal prior to arrival at said network element, and a previous path error (PPE) portion indicative of path errors present in said communication signal at said network element; and
   b) transmit said communication signal to a remote device.

* * * * *